United States Patent
Bronner et al.

(10) Patent No.: US 7,606,222 B2
(45) Date of Patent: Oct. 20, 2009

(54) SYSTEM AND METHOD FOR INCREASING THE RANGE OR BANDWIDTH OF A WIRELESS DIGITAL COMMUNICATION NETWORK

(75) Inventors: Peter E. Bronner, Mohnton, PA (US); William R. Bullman, Macungie, PA (US); Roberto Calderon, Perkiomenville, PA (US); Steven E. Strauss, Orefield, PA (US); Jinguo Yu, Flemington, NJ (US)

(73) Assignee: Agere Systems, Inc., Allentown, PA (US)

( * ) Notice: Subject to any disclaimer, the term of this patent is extended or adjusted under 35 U.S.C. 154(b) by 1103 days.

(21) Appl. No.: 11/013,194

(22) Filed: Dec. 15, 2004

(65) Prior Publication Data

US 2005/0259650 A1    Nov. 24, 2005

Related U.S. Application Data

(60) Provisional application No. 60/572,620, filed on May 19, 2004.

(51) Int. Cl.
 *H04L 12/66* (2006.01)
(52) U.S. Cl. ............... 370/352; 370/338; 370/395.2; 455/550.1; 709/243; 714/763; 714/774; 714/781; 714/790
(58) Field of Classification Search ............ 370/329, 370/352, 338, 395.2; 455/550; 709/243; 714/790, 763, 774, 781
See application file for complete search history.

(56) References Cited

U.S. PATENT DOCUMENTS

| | | | | |
|---|---|---|---|---|
| 4,939,732 A | * | 7/1990 | Okamoto et al. | 714/781 |
| 5,699,369 A | * | 12/1997 | Guha | 714/774 |
| 5,805,808 A | * | 9/1998 | Hasani et al. | 709/243 |
| 6,542,490 B1 | * | 4/2003 | Ahmadvand et al. | 370/338 |
| 6,553,540 B1 | * | 4/2003 | Schramm et al. | 714/790 |
| 6,959,411 B2 | * | 10/2005 | Lin | 714/763 |
| 7,050,407 B1 | * | 5/2006 | Frazer et al. | 370/329 |
| 7,123,598 B1 | * | 10/2006 | Chaskar | 370/331 |
| 7,385,985 B2 | * | 6/2008 | Narsinh et al. | 370/395.2 |
| 7,440,401 B2 | * | 10/2008 | Kang | 370/230.1 |
| 7,441,267 B1 | * | 10/2008 | Elliott | 726/13 |
| 2003/0064746 A1 | * | 4/2003 | Rader et al. | 455/550 |
| 2003/0099205 A1 | * | 5/2003 | Lee et al. | 370/252 |
| 2004/0151109 A1 | | 8/2004 | Batra et al. | |
| 2005/0226190 A1 | | 10/2005 | Lam | |
| 2006/0072614 A1 | | 4/2006 | Ogiso et al. | |
| 2007/0100819 A1 | * | 5/2007 | Chan et al. | 707/6 |

\* cited by examiner

*Primary Examiner*—Gerald Gauthier

(57) ABSTRACT

A system and method, associated with a receiver, for increasing the range or bandwidth of a wireless digital communication network and a receiver incorporating the system or the method. In one embodiment, the system includes: (1) a service class detector configured to determine a service class of a PDU received by the receiver from the wireless digital communication network and (2) a frame check sequence checker coupled to the service class detector and configured to disregard error-checking information in the PDU when the service class indicates that the PDU is a streaming media PDU.

21 Claims, 3 Drawing Sheets

SYSTEM AND METHOD FOR INCREASING THE RANGE OR BANDWIDTH OF A WIRELESS DIGITAL COMMUNICATION NETWORK

CROSS-REFERENCE TO RELATED APPLICATION

The present application claims priority based on U.S. Provisional Patent Application Ser. No. 60/572,620, filed on May 19, 2004, by Bronner, et al., entitled "Controlling Range of Wireless Digital Signals by Changing Maximum Allowed Bit Error Rate (BER) for Packet Acceptance," commonly assigned with the present application and incorporated herein by reference.

TECHNICAL FIELD OF THE INVENTION

The present invention is directed, in general, to wireless communications networks and, more specifically, to a system and method for increasing the range or bandwidth of a wireless digital communication network.

BACKGROUND OF THE INVENTION

Wireless digital communication networks are coming into widespread us in today's world. Such networks are suitable for communicating digital data, such as computer files, reliably, quickly and flexibly.

To send data from a one station in the network (a "transmitting station") to another (a "receiving station"), the transmitting station first divides the data into time-sliced pieces. Then, the transmitting station adds network routing and error-checking information to each of the pieces to create protocol data units (PDUs), which for many protocols are called "packets." The transmitting station then transmits each PDU separately over the network. The receiving station uses the routing information to receive the PDUs via the network, uses the error-checking information to verify the segments of data and reassembles the segments to recreate the data.

Error checking is important, because data corruption can have serious consequences. Data corruption can occur as a result of collision (multiple PDUs being transmitted concurrently), external interference (e.g., radio frequency interference from without the network) or insufficient transmit power (e.g., if the distance over which the PDUs are transmitted becomes too great). If a particular segment of data is found to be corrupt, the PDU containing the corrupt segment must be retransmitted, which takes time and consumes network bandwidth.

Wireless digital communication networks are also capable of communicating streaming media—digitized or digital audio (e.g., voice or music) or video—to allow, for example, telephone conversations to be carried over the network. Streaming media is simply digital data and appears no different to the network from a computer file. However, unlike a computer file, streaming media is often interactive and is thus constrained to be time-sensitive. As a result, rarely is sufficient time available to retransmit corrupt segments.

In view of this significant constraint, prior art wireless digital communication network designs have focused on altogether avoiding the need for retransmission by eliminating error in data. One way to avoid retransmission is to boost transmission power. Unfortunately, this requires additional power and shortens battery life. Another way is to limit the range over which the data is transmitted. Limiting range, however, limits the flexibility and utility of the network. Yet another way is to add error-correcting data to each PDU. While error-correcting information may be used to reconstruct the data at the receiving station, the error-correcting information requires additional network bandwidth to communicate and therefore limits the capacity of the network to handle data. Still another way is to improve receiver sensitivity or noise or fading immunity, but this makes the receiver design more complex and expensive. Yet still another way is to reduce the data transmission rate. Unfortunately, this reduces network efficiency. None of these approaches has proven satisfactory.

Accordingly, what is needed in the art is a better way to communicate streaming media over a wireless digital communication network. More specifically, what is needed in the art is a way to increase the range or bandwidth of a wireless digital communication network with respect to the communication of streaming media.

SUMMARY OF THE INVENTION

To address the above-discussed deficiencies of the prior art, the present invention provides, in one aspect, a system, associated with a receiver, for increasing the range or bandwidth of a wireless digital communication network. In one embodiment, the system includes: (1) a service class detector configured to determine a service class of a PDU received by the receiver from the wireless digital communication network and (2) a frame check sequence checker coupled to the service class detector and configured to disregard error-checking information in the PDU when the service class indicates that the PDU is a streaming media PDU. For purposes of the present invention, "streaming media" is defined as digitized or digital audio (e.g., voice or music) or video. Also, for purposes of the present invention, "receiver" is broadly defined to include not only endpoint stations, such as handsets, but also home and media gateways and other intermediate network nodes or waypoints that receive data wirelessly, even though they may subsequently retransmit that data wirelessly or by wireline.

Disregarding the error-checking information potentially increases wireless digital communication network range by allowing a higher bit error rate (BER). Disregarding the error-checking information potentially increases wireless digital communication network bandwidth by avoiding retransmission of PDUs, freeing the bandwidth for transmission of other PDUs.

In another aspect, the present invention provides a method, carried out in a receiver, of increasing the range or bandwidth of a wireless digital communication network. In one embodiment, the method includes: (1) determining a service class of a PDU received by the receiver from the wireless digital communication network and (2) disregarding error-checking information in the PDU when the service class indicates that the PDU is a streaming media PDU.

In yet another aspect, the present invention provides a wireless digital communication network receiver. In one embodiment, the receiver includes: (1) an antenna, (2) a downconverter coupled to the antenna, (3) a physical layer processor coupled to the downconverter, (4) a service class detector configured to determine a service class of a PDU received by the receiver from the wireless digital communication network, (5) a frame check sequence checker coupled to the service class detector and configured to disregard error-checking information in the PDU when the service class indicates that the PDU is a streaming media PDU and (6) a codec coupled to the frame check sequence checker.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
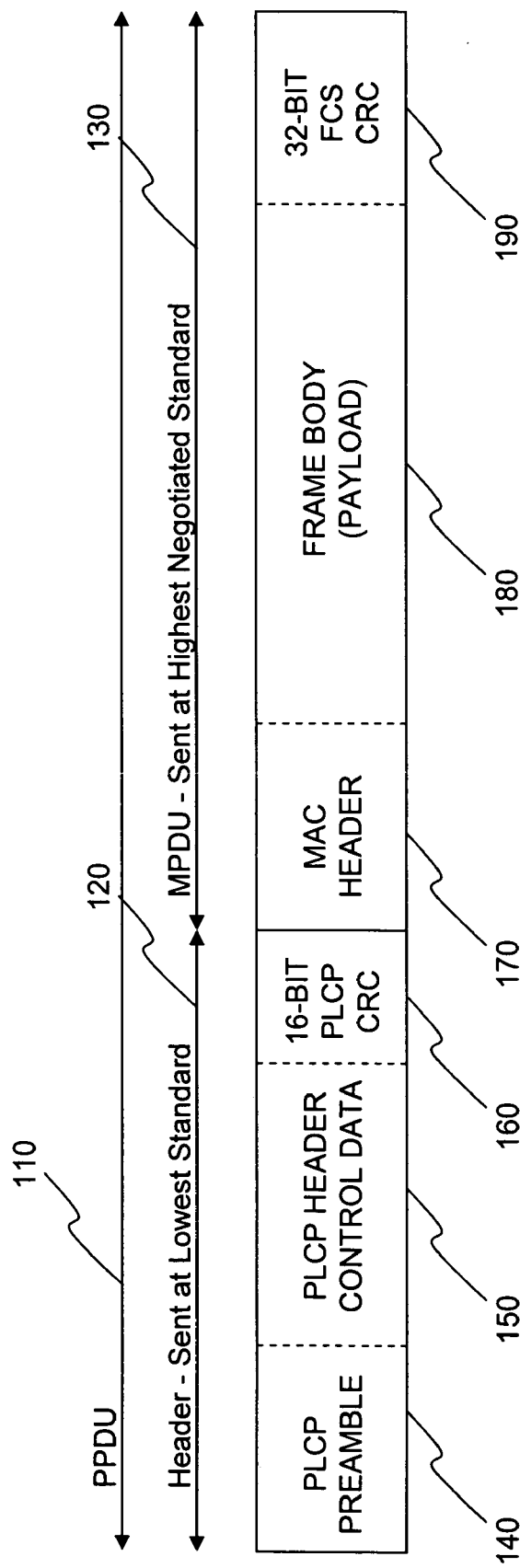
FIG. 1 illustrates a schematic diagram of an exemplary PDU.

Before describing exemplary embodiments of a system, receiver or method, the structure of an exemplary PDU will be set forth. Accordingly, referring initially to FIG. 1, illustrated is a schematic diagram of an exemplary physical layer convergence procedure (PLCP) PDU (PPDU) 110 that complies with IEEE 802.11. Those skilled in the art will recognize, however, that the principles of the present invention encompass any PDU capable of containing streaming media.

Those skilled in the pertinent art are familiar with the structure and function of the PPDU 110. The PPDU 110 includes a physical layer header 120 and a medium access controller (MAC) PDU (MPDU) 130.

The physical layer header 120 includes a PLCP preamble 140, PLCP header control data 150 and a 16-bit cyclic redundancy check (CRC) 160. The PLCP preamble 140 trains the receiver so it can receive the remainder of the PPDU 110. The PLCP header control data 150 includes various physical layer routing and other control information and more specifically identifies the service class of the PPDU.

In the illustrated embodiment of the present invention, the service class identifies whether or not the PPDU is a streaming media PDU. The present invention is not limited, however to PDUs in which the service class is explicitly identified in the PDU; rather, the service class may be inferred from a combination of implicit indications, including perhaps the payload of the PDU.

The 16-bit CRC 160 allows the receiver to verify the contents of the PLCP header control data 150. According to IEEE 802.11, the physical layer header 120 is transmitted to the receiver at the lowest data rate over the wireless digital communication network.

The MPDU includes a MAC header 170, a frame body 180 and a 32-bit frame check sequence (FCS) 190. The MAC header 170 contains MAC-layer routing information. The frame body 180 contains the "payload" of the PPDU 110 which, in the case of streaming media, is a time-sliced piece of the streaming media. The FCS 190 contains error-checking information that allows the contents of the frame body 180 to be verified. In the illustrated embodiment of the present invention, it is the FCS 190 that can be ignored if the service class of the PPDU 110 indicates that it is a streaming media PDU. According to IEEE 802.11, the MPDU 130 is transmitted to the receiver at the highest negotiated data rate over the wireless digital communication network. Those skilled in the pertinent art are familiar with the way in which transmission rates are negotiated in a wireless digital communication network.

Figure 2:
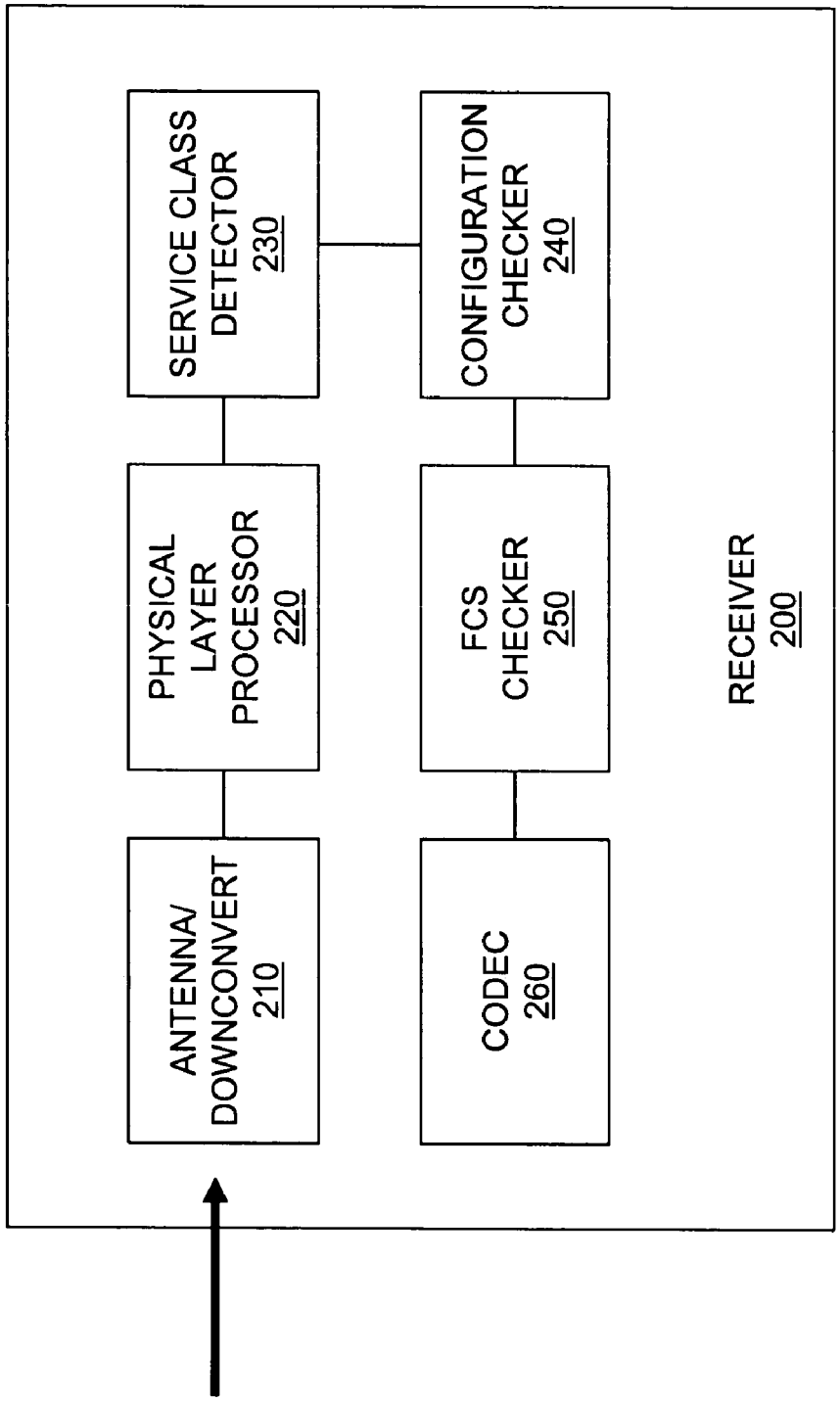
FIG. 2 illustrates a block diagram of one embodiment of a system for increasing the range or bandwidth of a wireless digital communication network constructed according to the principles of the present invention.

Having described an exemplary PDU, an exemplary embodiment of a system can now be described. Accordingly, turning now to FIG. 2 and with continuing reference to FIG. 1, illustrated in FIG. 2 is a block diagram of one embodiment of a system for increasing the range or bandwidth of a wireless digital communication network constructed according to the principles of the present invention. The illustrated embodiment of the system is operable within a wireless digital receiver 200.

An antenna/downconverter 200 is configured to receive and strip the carrier wave from PDUs received from the wireless digital communication network (not shown, but represented by a relatively thick arrow pointing toward the antenna/downconverter 210).

A physical layer processor 220 is coupled to the antenna/downconverter 210. The physical layer processor 220 receives the downconverted PDUs and analyzes the physical layer header 120 of the PDUs to extract and verify the PLCP header control data 150. Included in the PLCP header control data 150 is information identifying the service classes of the PDUs.

A service class detector 230 is coupled to the physical layer processor 220. The service class detector 230 is configured to determine the service class of the PDUs. In the illustrated embodiment of the present invention, the service class detector simply examines the service class information extracted from the PLCP header control data 150 by the physical layer processor 220.

In the illustrated embodiment of the present invention, the error-checking information disregarding function of the present invention may be activated or deactivated by means of configuration data, e.g., a configuration bit (not shown). In one embodiment of the present invention, the configuration data is user-programmable.

For example, if the configuration bit is "1," the error-checking information (e.g., FCS 190) is disregarded when the service class indicates that a given PDU is a streaming media PDU. If the configuration bit is "0," the error-checking information is evaluated even if the service class indicates that a given PDU is a streaming media PDU.

For this reason, FIG. 2 illustrates a configuration checker 240 coupled to the service class detector 230. The configuration checker 240 checks the configuration data to determine whether the error-checking information disregarding function of the present invention is activated.

An FCS checker 250 is coupled to the configuration checker 240. The FCS checker 250 is configured to disregard error-checking information in the PDU when the service class indicates that the PDU is a streaming media PDU.

A coder/decoder ("codec") 260 is coupled to the FCS checker 250. The codec 260 receives the piece of streaming media (which is in digital form) and converts the piece to analog form for reproduction to a user. Those skilled in the pertinent art will recognize that the receiver 200 is greatly simplified but will understand that such simplification enhances an understanding of the operation of the present invention.

Figure 3:
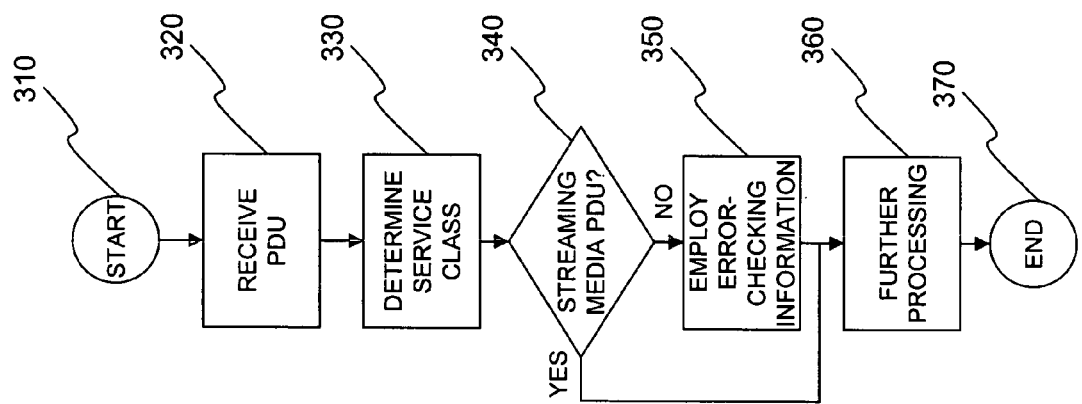
FIG. 3 illustrates a flow diagram of one embodiment of a method of increasing the range or bandwidth of a wireless digital communication network carried out according to the principles of the present invention.

Turning now to FIG. 3, illustrated is a flow diagram of one embodiment of a method of increasing the range or bandwidth of a wireless digital communication network carried out according to the principles of the present invention. The method begins in a start step 310 in which it is desired to receive PDUs, including streaming media PDUs.

A PDU is received in a step 320. Then, the service class of the PDU is determined in a step 330. Next, in a decisional step 340, it is decided whether the service class indicates that the PDU is or is not a streaming media PDU. If the PDU is not a streaming media PDU, the error-checking information (e.g., FCS) in the PDU is employed to check the payload in a step 350. Otherwise, the step 350 is bypassed.

Further processing occurs in a step 360. For example, if the PDU is a streaming media PDU, the time-sliced piece of streaming media contained in the PDU (the payload) is converted to analog form and reproduced. Otherwise, if the PDU is not a streaming media PDU and the PDU payload is found to be corrupt, a retransmission of the PDU may be requested according to protocol. The method ends in an end step 370.

From the above, it is evident that the present invention introduces a better way to communicate streaming media over a wireless digital communication network. More specifically, it is evident that the present invention introduces a way to increase the range or bandwidth of a wireless digital communication network with respect to the communication of streaming media. Disregarding the error-checking information potentially increases wireless digital communication network range by allowing a higher BER. Further, disregarding the error-checking information potentially increases wireless digital communication network bandwidth by avoiding retransmission of PDUs, freeing the bandwidth for transmission of other PDUs.

Although the present invention has been described in detail, those skilled in the art should understand that they can make various changes, substitutions and alterations herein without departing from the spirit and scope of the invention in its broadest form.

What is claimed is:

1. A system, associated with a receiver, for increasing the range or bandwidth of a wireless digital communication network, comprising:
    a service class detector configured to determine a service class of a protocol data unit (PDU) received by said receiver from said wireless digital communication network; and
    a frame check sequence checker coupled to said service class detector and configured to disregard error-checking information in said PDU when said service class indicates that said PDU is a streaming media PDU.

2. The system as recited in claim 1 wherein said error-checking information is contained within a frame check sequence of said PDU.

3. The system as recited in claim 1 wherein said frame check sequence checker is further configured to disregard said error-checking information in said PDU based on configuration data associated with said receiver.

4. The system as recited in claim 3 wherein said configuration data is user-programmable.

5. The system as recited in claim 1 wherein said wireless digital communication network complies with a selected one of:
    RFC 1889, and
    IEEE 802.11.

6. The system as recited in claim 1 wherein said receiver receives both computer data PDUs and streaming media PDUs.

7. The system as recited in claim 1 wherein said receiver receives a portion of said streaming media PDU containing a payload and said error-checking information at a maximum data rate.

8. A method, carried out in a receiver, of increasing the range or bandwidth of a wireless digital communication network, comprising:
    determining a service class of a protocol data unit (PDU) received by said receiver from said wireless digital communication network; and
    disregarding error-checking information in said PDU when said service class indicates that said PDU is a streaming media PDU.

9. The method as recited in claim 8 wherein said error-checking information is contained within a frame check sequence of said PDU.

10. The method as recited in claim 8 wherein said disregarding comprises disregarding said error-checking information in said PDU based on configuration data associated with said receiver.

11. The method as recited in claim 10 wherein said configuration data is user-programmable.

12. The method as recited in claim 8 wherein said wireless digital communication network complies with a selected one of:
    RFC 1889, and
    IEEE 802.11.

13. The method as recited in claim 8 wherein said receiver receives both computer data PDUs and streaming media PDUs.

14. The method as recited in claim 8 wherein said receiver receives a portion of said streaming media PDU containing a payload and said error-checking information at a maximum data rate.

15. A wireless digital communication network receiver, comprising:
    an antenna;
    a downconverter coupled to said antenna;
    a physical layer processor coupled to said downconverter;
    a service class detector configured to determine a service class of a protocol data unit (PDU) received by said receiver from said wireless digital communication network;
    a frame check sequence checker coupled to said service class detector and configured to disregard error-checking information in said PDU when said service class indicates that said PDU is a streaming media PDU; and
    a codec coupled to said frame check sequence checker.

16. The receiver as recited in claim 15 wherein said error-checking information is contained within a frame check sequence of said PDU.

17. The receiver as recited in claim 15 wherein said frame check sequence checker is further configured to disregard said error-checking information in said PDU based on configuration data associated with said receiver.

18. The receiver as recited in claim 17 wherein said configuration data is user-programmable.

19. The receiver as recited in claim 15 wherein said wireless digital communication network complies with a selected one of:
    RFC 1889, and
    IEEE 802.11.

20. The receiver as recited in claim 15 wherein said receiver receives both computer data PDUs and streaming media PDUs.

21. The receiver as recited in claim 15 wherein said receiver receives a portion of said streaming media PDU containing a payload and said error-checking information at a maximum data rate.

* * * * *